Figure 1:
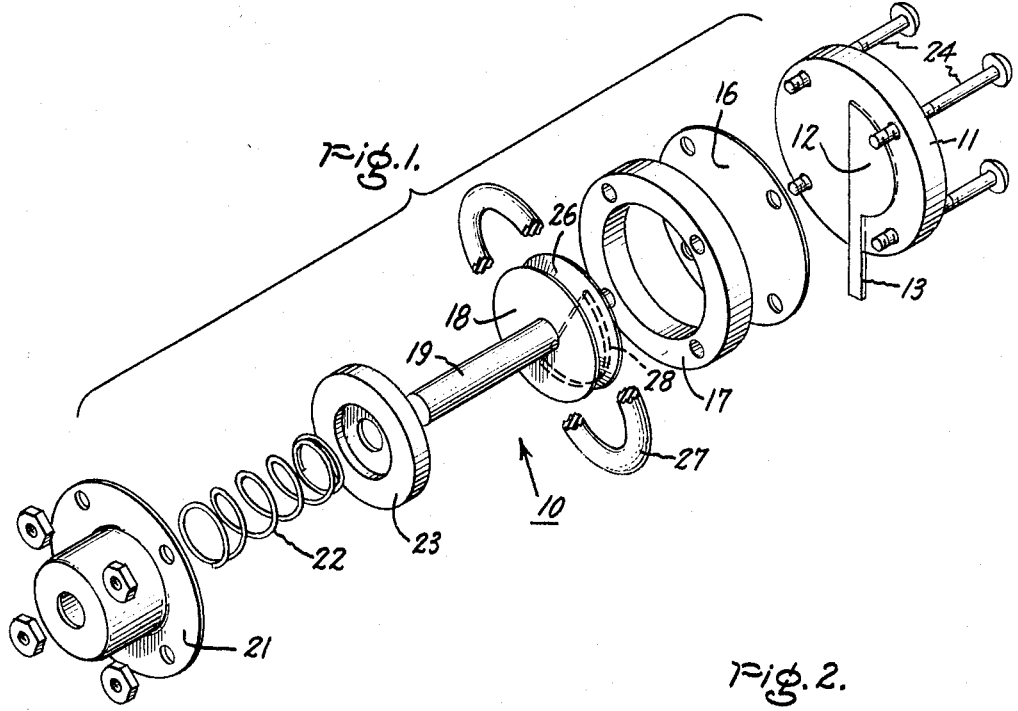

Inventor:
John C. Devins,
by Leo J. Matossi
His Attorney.

United States Patent Office

3,287,613
Patented Nov. 22, 1966

3,287,613
VARIABLE CAPACITOR
John C. Devins, Burnt Hills, N.Y., assignor to General Electric Company, a corporation of New York
Filed Oct. 1, 1964, Ser. No. 400,717
6 Claims. (Cl. 317—249)

This invention relates to improvements in variable capacitors and more particularly to a variable capacitor construction providing a high capacity in a small occupancy volume with adequate electrical performance for use in radio receivers.

In the trend toward miniaturization of radio receivers the requisite miniaturization of the tuning capacitor has been achieved in the past by reducing the area and spacing of the conventional ganged multiplate meshing capacitor and using a thin polymer film as a loosely fitting spacer therein, the latter having the predominate function of preventing shorting out of the capacitor plates. Such capacitors are expensive to fabricate and have a reduced capacity per unit area because of the series air gap. Therefore, attempts have been made to build variable capacitors using two small plates placed in intimate contact with a thin polymer film to serve as the dielectric medium in place of air, which is customarily relied upon as the dielectric medium. Unfortunately, such attempts have failed largely because of the difficulty encountered in obtaining and retaining the requisite sufficiently intimate contact between the movable electrodes and the dielectric, the polymer film. Upon loss of the requisite degree of intimate contact therebetween a film of air will be introduced over one face of the dielectric thereby introducing an unregimented variable dielectric medium into the system in series with the solid dielectric (polymer film) resulting in non-reproducible capacity for the device. In the aforementioned miniaturized ganged capacitors employing loosely fitting polymer film spacers, a layer of air exists on both sides of the polymer film and, since any change in the air film on one side of the solid dielectric is counterbalanced by an opposite like change on the other side of the solid dielectric film the deleterious effect of such change is not a serious one. However, in addition to the expense of fabrication, mechanical reasons; i.e. wear, re-orientation of parts, have prevented realization of the full potential of the solid dielectric in variable capacitors comprising small plates in intimate contact with a thin polymer film.

Variable capacitors for use in radio receivers must possess certain qualities: a sufficiently high, reproducible maximum capacity; a maximum to minimum capacity ratio of greater than 10; capability of being ganged so as to tune more than one circuit; a Q (reciprocal loss tangent) of 100 or more at 1 mc., and low construction cost.

It is, therefore, a prime object of this invention to provide a variable capacitor device employing a solid dielectric and remaining substantially free of air film whereby the device maintains a high degree of reproducibility in its tuning setting.

It is another object of this invention to provide a variable capacitor suitable for use in radio receivers employing a high capacity solid dielectric film and having a high degree of reproducibility in tuning.

These and other objects are attainable employing the construction disclosed herein wherein a pair of small plate electrodes rotatable relative to each other are arranged in intimate contact with a thin sheet of solid dielectric employing a thin layer of low viscosity oil disposed between the dielectric sheet and each electrode plate and means for collecting and isolating any small amount of air present in the system.

Figure 3:
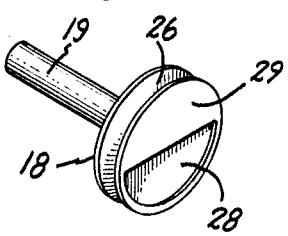
Figure 2:
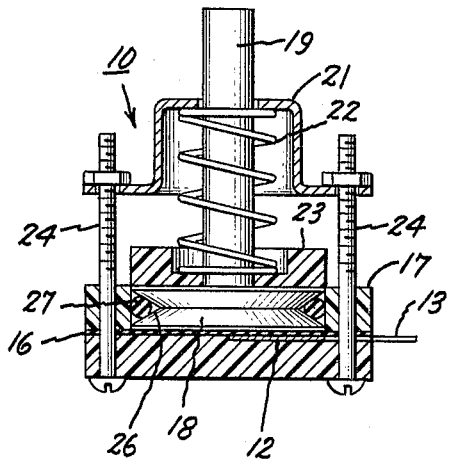

Thus, with the aforementioned objects and other objects in view as will hereinafter more fully appear, reference is now made to the following description taken in connection with the accompanying drawing in which:

FIG. 1 shows an exploded view of a device embodying this invention;
FIG. 2 is a view in section showing the device shown in FIG. 1 assembled; and
FIG. 3 shows the rotor plate in greater detail.

Referring now to the drawing which illustrates a working embodiment of this invention, the capacitor unit 10 comprises stator plate 11, made of an electrically non-conducting material, such as plastic, supporting the semicircular electrode plate 12 and connector 13, dielectric film 16, retaining ring 17, rotating capacitor plate 18 received within ring 17, shaft 19 extending from rotor plate 18 to enable rotation thereof, and biasing means to complete the housing and urge rotor plate 18 against the surface of dielectric film 16. The biasing means comprises spring retainer ring 21, spring 22 and low-friction bearing 23.

The entire capacitor unit 10 is is assembled in the manner shown in FIG. 2 employing bolts 23 to rigidly, permanently align the several elements relative to each other. During assembly, a film of low viscosity oil, for example, silicone oil having a viscosity of about 100 centistokes (cs.), is introduced between each face of dielectric film 16; that is, between film 16 and stator plate 11 and between film 16 and rotor plate 18. Although higher viscosity oil may be employed, it has been found that if the viscosity is increased substantially (e.g. 1000 cs.), the initial thickness of oil film produced immediately on rotation of rotor plate 18 changes in the period following the setting with this change producing an undesirable change in capacity of from about 10 to about 20 percent in several minutes.

In selecting the fluid to be introduced between each face of dielectric film 16 and the adjacent plate elements 11 and 18 certain properties of the fluid should be observed for optimum results. Thus, this fluid should (a) maintain a viscosity of less than about 100 cs. down to the lowest temperature at which the device is expected to operate, (b) only contribute a low electrical loss to the system (tan $\delta$ is less than 0.01), (c) possess good chemical stability, and (d) be compatible with the dielectric film to the extent that the fluid causes no, or very little, swelling of the dielectric film.

The presence of the thin film of oil on each side of dielectric film 16 serves to enhance the intimacy of contact between the electrode plates 11 and 18 and dielectric film 16 providing a barrier to the entry of air. In addition, the presence of the oil film provides a lubricating action with respect to the movement of rotor plate 18 relative to dielectric film 16 and further contributes to film 16 a resistance to wear and to wrinkling, which wrinkling would seriously diminish the reproducibility of tuning settings.

In those experiments in which thin films of silicone grease were employed it was observed that two undesirable phenomena occurred. First, the grease film streaked and second, the film varied in thickness with each turn of the rotor 18. As a result of these effects, the capacity was not very reproducible and varied by as much as 20 percent on repeated settings. Also in those constructions in which the electrode 12 was produced by depositing copper by an electroless process, the use of grease increased wear of this copper film exponentially, because as particles of copper wore off they were deposited in the grease film to further increase the rate of wear. This latter problem was greatly reduced in severity by coating the copper film with a thin layer of $TiO_2$.

The use of low viscosity oil does, of course, necessitate sealing of the system to prevent leakage and consequent loss of the oil. Sealing is accomplished by supplying groove 26 in the outer edge of rotor 18 and fitting the edge of rotor 18 with O-ring seal 27 composed of an elastomer such as, for example, neoprene. This arrangement has proven effective over relatively long periods during which friction remains relatively low and rotation of rotor 18 is accomplished easily.

Although the capacitor unit 10 has been assembled using an excess of oil to create the necessary films referred to hereinabove seeking to more effectively avoid the introduction of appreciable quantities of air between the plates during assembly, it was always found that after a few rotations of rotor 18 to various setting positions air bubbles appeared in the sensitive area, that is the region existing between the plates when the plates are oriented relative to each other to provide at least a substantial value of capacitance. The presence of air bubbles at the time and place described would render such a construction commercially unacceptable.

These bubbles of air may have been introduced into the system in any or all of a variety of ways: air could have been dissolved in the oil, air could have been in the groove containing the O ring, and air could have been pumped in around the edges of unit 10 by the flexing of the dielectric film 16 during rotation of rotor 18. Because air has such a low dielectric constant, the presence thereof in the system described herein greatly affects the reproducibility of the system. Absolute elimination of air from the system could be accomplished only by elaborate preparation of materials and expensive assembly procedures, however, and therefore a novel mechanism has been provided to make the presence of these small quantities of air as innocuous as possible.

Rotor 18 is constructed entirely of an electrically conductive material, such as copper, and is fitted with a conducting shaft 19 to simplify the making of an electrical contact therewith. With such a rotor small amounts of wear can be tolerated. The necessary variable capacity was obtained by milling into the surface of the rotor a half-moon shaped recess 28 about 10 mils deep on one-half of face 29 of rotor 18. When this half-moon area is disposed opposite stator electrode 12 the capacity of unit 10 will have its minimum value, because the distance between electrode 12 and the bottom of recess 28 would be great enough to greatly reduce the capacitance value until any stray capacitances become controlling. However, the most important aspect of this construction in addition to providing the minimum capacity position for the device 10 is the fact that the milled-out section 28 also functions as a collection zone, or sump, for the small number of air bubbles which are inevitably present in any such system employing economically feasible techniques for the construction and assembly thereof. By concentrating the location of the air bubbles in the system within zone 28, the deleterious effect ordinarily attendant the presence of such air is greatly diminished, because when isolated in this position (within zone 28) the air bubbles only are able to alter the capacity to a negligible degree. Even after prolonged periods of use of this device no air bubbles were ever detected in unit 10 in the sensitive region between rotor surface 29 and dielectric film 16.

Both 0.25 mil Mylar (polyethylene terephthalate film manufactured by E. I. du Pont de Nemours & Co. of Wilmington, Del.), and 0.3 polypropylene films have been used as the solid dielectric films. Although the polypropylene films are preferred, any polymer film available in uniformly thick sheets, having a dielectric loss suitable to the application, i.e., tan $\delta$ less than 0.001 for radio receiver application, and having a dielectric constant in the range of from about 2 to about 3 is suitable. For such films a thickness of from about 0.25 to about 0.5 mil will have an inherent capacity of about 250 pfd./cm.$^2$, a value readily enabling the requisite maximum to minimum capacity ratio for radio receivers of at least 10, in order to cover the broadcast band.

In order that the aforementioned capacity ratio would be available in unit 10, the stator electrode 12 was made having the same radius as the milled out portion 28 whereby stator electrode 12 just covers the area of cutout portion 28 of rotor 18. The capacity ratio may be decreased by increasing the amount of overlap of stator electrode 12 over the edge of the cut-out portion 28.

Stator electrode 12 may, of course be constructed in two or more concentric semi-circular bands to permit ganged tuning of several circuits simultaneously. In addition, the shape of the stator electrodes may be altered to produce any desired relationship between the angle of rotation of rotor 18 and capacity of unit 10.

Of the capacitor units actually constructed and measured for capacity and equivalent parallel resistance, the typical unit displayed a maximum capacity of 330 pfd. with an equivalent parallel resistance of $1 \times 10^7$ ohms and minimum capacity of 23 pfd. at 100 kc. At 755 kc. the Q of this capacitor was 1360. As part of the testing and measuring procedure, the capacitor unit 10 was attached to a device which would first rotate the rotor 18 through 180° in 1.25 seconds and then reverse to rotate rotor 18 through a 180° arc in the opposite direction in a similar time period. The capacitor 10 was connected to a Boonton 100 kc. bridge and operated until a short circuit occurred indicating failure of the film. This failure occurred after 40 minutes of continuous operation, the equivalent of about 2000 revolutions. Also a comparison of capacitor units constructed in the manner described has shown that capacitance values for similarly constructed units are quite reproducible from one capacitor to another as well as with repeated settings on these capacitors tested alone.

To determine the effect of temperature, a capacitor unit 10 was cooled to −8° C. overnight and was then measured quickly before the temperature could rise appreciably. The capacity and parallel resistance were found to be identical within the values of reproducibility shown for similar units 10 tested at room temperature. The ease of rotation of rotor 18 was not appreciably decreased at the lower temperature; that was one of the principle reasons for choosing silicone oil as the lubricant.

In an exemplary construction having for each facing electrode an area of about 1.72 cm.$^2$ a capacity of 330 pfd. was obtained which, assuming the dielectric constant of the film was to be 2.0, would correspond to a thickness of 0.36 mil for the dielectric thickness, which is very nearly within the expected tolerance for a film having a nominal 0.3 mil manufacturer's rating for thickness. It may be concluded, therefore, that the presence of the oil films in series with the solid dielectric does not contribute greatly to the total capacitance and that the solid dielectric is being utilized very nearly to its full potential.

Although the construction set forth herein is the best arrangement contemplated at this time, it is possible that variations thereof are possible, which will embody the advance contributed herein whereby although air is substantially eliminated from the system some air, whether it be residual or whether it enters the system later, can be tolerated by providing means for its collection and isolation in an innocuous position in the system.

What I claim as new and desire to secure by Letters Patent of the United States is:

1. A variable capacitor construction comprising in combination:
   (a) a stator capacitor electrode,
   (b) a rotor capacitor electrode disposed in juxtaposition to said stator electrode,
   (c) a thin sheet of solid dielectric material disposed between said electrodes with each electrode contiguous thereto,
      (1) said rotor electrode being rotatable relative to said stator electrode to effect for the assembly of said electrodes and the dielectric sheet a value of capacity ranging from a minimum to a maximum value,
(d) a lubricant material covering at least the portion of said dielectric sheet contiguous with said electrodes,
  (1) said lubricant material being a liquid having a viscosity of less than about 100 centistokes, and having a value for tangent δ of less than about 0.01,
(e) means in contact with said rotor electrode for urging the assembly of electrodes and said dielectric sheet into more intimate contact,
(f) means girding said rotor electrode for preventing the entry of air between said rotor electrode and said dielectric sheet, and
(g) an area recessed into the face of said rotor electrode in contact with said dielectric sheet,
  (1) said recessed area containing lubricant material and having a depth of sufficient magnitude that the distance between the stator electrode and the bottom of said recessed area will result in a very low value of capacity with said stator electrode, dielectric sheet and recessed area being arranged in juxtaposition.

2. The variable capacitor construction substantially as recited in claim 1 wherein the lubricant material is silicone oil.

3. The variable capacitor construction substantially as recited in claim 2 wherein the stator and recessed area are each substantially semicircular in shape.

4. A variable capacitor construction comprising in combination:
(a) a stator capacitor electrode,
(b) a rotor capacitor electrode disposed in juxtaposition to said stator electrode,
(c) a thin sheet of solid dielectric material disposed between said electrodes contiguous thereto,
  (1) said rotor electrode being rotable relative to said stator electrode to effect for the assembly of said electrodes and the dielectric sheet a value of capacity ranging from a minimum to a maximum value,
(d) a liquid lubricant material, having a viscosity of less than about 100 centistokes, and a value for tangent α of less than about 0.01, between and in contact with each of said electrodes and with at least the adjacent portion of each face of said dielectric sheet disposed therebetween, and
(e) means in communication with the space between said rotor electrode and said dielectric sheet containing said lubricant material for accumulating and isolating any small amount of air occurring in said lubricant material filled space.

5. The variable capacitor construction substantially as recited in claim 4 wherein the accumulating means comprises a recess in the face of the rotor electrode.

6. The variable capacitor construction substantially as recited in claim 4 wherein the lubricant material is silicone oil.

References Cited by the Examiner

UNITED STATES PATENTS 3,202,889  8/1965  Matsui _____ 317—249

FOREIGN PATENTS 930,357  7/1963  Great Britain.

OTHER REFERENCES

Birks, J. B.: Modern Dielectric Materials, Heywood and Co., London, 1960, pp. 146–148.

LEWIS H. MYERS, *Primary Examiner.*

ROBERT K. SCHAEFER, *Examiner.*

E. GOLDBERG, *Assistant Examiner.*